United States Patent
Park et al.

(10) Patent No.: US 10,931,939 B2
(45) Date of Patent: Feb. 23, 2021

(54) GLASSLESS THREE-DIMENSIONAL (3D) DISPLAY APPARATUS AND CONTROL METHOD THEREOF

(71) Applicant: SAMSUNG ELECTRONICS CO., LTD., Suwon-si (KR)

(72) Inventors: Seung-ran Park, Hwaseong-si (KR); Ho-young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 530 days.

(21) Appl. No.: 15/154,423

(22) Filed: May 13, 2016

(65) Prior Publication Data

US 2017/0134720 A1    May 11, 2017

(30) Foreign Application Priority Data

Nov. 6, 2015    (KR) .......................... 10-2015-0155548

(51) Int. Cl.
  *H04N 5/073*    (2006.01)
  *H04N 13/351*    (2018.01)
  (Continued)

(52) U.S. Cl.
  CPC ......... *H04N 13/351* (2018.05); *H04N 13/128* (2018.05); *H04N 13/261* (2018.05);
  (Continued)

(58) Field of Classification Search
  CPC ... H04N 13/128; H04N 13/305; H04N 13/351
  See application file for complete search history.

(56) References Cited

U.S. PATENT DOCUMENTS 8,654,182 B2    2/2014  Ishikawa et al.
8,774,267 B2    7/2014  Gaddy et al.
(Continued)

FOREIGN PATENT DOCUMENTS

EP    2 387 243 A2    11/2011
JP    2015-503258 A    1/2015
(Continued)

OTHER PUBLICATIONS

Communication dated Dec. 12, 2019 issued by the Korean Patent Office in counterpart Application No. 10-2015-0155548.
(Continued)

*Primary Examiner* — Zhubing Ren
(74) *Attorney, Agent, or Firm* — Sughrue Mion, PLLC

(57) ABSTRACT

A glassless three-dimensional (3D) display apparatus includes a storage configured to store information on a possible depth range providable by the glassless 3D display apparatus and information on a reference output depth range; a display configured to provide a plurality of image views having different viewpoints to a user; and a processor configured to render the plurality of image views having the different viewpoints based on a depth of an input image, to provide a multi-view image, wherein the processor is configured to adjust, based on the depth of the input image, at least one of a minimum value and a maximum value of the reference output depth range, within the possible depth range, to determine an output depth range corresponding to the input image, and render the plurality of image views based on the determined output depth range.

13 Claims, 15 Drawing Sheets

(51) Int. Cl.
*H04N 13/128* (2018.01)
*H04N 13/261* (2018.01)
*H04N 13/305* (2018.01)
*H04N 13/31* (2018.01)
*H04N 13/324* (2018.01)
*H04N 13/398* (2018.01)
*H04N 13/00* (2018.01)

(52) U.S. Cl.
CPC ........... *H04N 13/305* (2018.05); *H04N 13/31* (2018.05); *H04N 13/324* (2018.05); *H04N 13/398* (2018.05); *H04N 2013/0081* (2013.01)

(56) References Cited

U.S. PATENT DOCUMENTS

| | | | |
|---|---|---|---|
| 8,982,187 | B2 | 3/2015 | Wang |
| 9,041,709 | B2 | 5/2015 | Bruls et al. |
| 9,105,133 | B2 | 8/2015 | Baik |
| 9,129,146 | B2 | 9/2015 | Kim et al. |
| 2011/0310982 | A1* | 12/2011 | Yang .............. H04N 21/234327 375/240.26 |
| 2013/0022111 | A1 | 1/2013 | Chen et al. |
| 2014/0205015 | A1 | 7/2014 | Rusert et al. |
| 2014/0313191 | A1 | 10/2014 | Bruls et al. |
| 2014/0333739 | A1* | 11/2014 | Yang .................... G06K 9/4642 348/54 |
| 2015/0116312 | A1 | 4/2015 | Baik |
| 2016/0225157 | A1* | 8/2016 | Yuan ........................ G06T 7/13 |

FOREIGN PATENT DOCUMENTS

| | | |
|---|---|---|
| KR | 1020110004267 A | 1/2011 |
| KR | 10-2011-0116166 A | 10/2011 |
| KR | 101364860 B1 | 2/2014 |
| KR | 1020140043243 A | 4/2014 |
| KR | 1020140068013 A | 6/2014 |
| KR | 101498535 B1 | 3/2015 |
| KR | 10-2015-0049952 A | 5/2015 |
| KR | 1020150062187 A | 6/2015 |
| WO | 2013/081435 A1 | 6/2013 |

OTHER PUBLICATIONS

Communication dated Jun. 29, 2020, issued by the Korean Intellectual Property Office in corresponding Korean Application No. 10-2015-0155548.

* cited by examiner

GLASSLESS THREE-DIMENSIONAL (3D) DISPLAY APPARATUS AND CONTROL METHOD THEREOF

CROSS-REFERENCE TO RELATED APPLICATION

This application claims priority from Korean Patent Application No. 10-2015-0155548, filed on Nov. 6, 2015, in the Korean Intellectual Property Office, the disclosure of which is incorporated herein in its entirety by reference.

BACKGROUND

1. Field

Apparatuses and methods consistent with exemplary embodiments relate to a glassless three-dimensional (3D) display apparatus and a control method thereof, and more particularly, to a glassless 3D display apparatus capable of changing an output depth range and providing a 3D image, and a control method thereof.

2. Description of the Related Art

Along with rapid development of electronics technology, various types of electronic apparatuses are developed and provided. For example, a display apparatus such as a television (TV) that is one of widely used home appliances has been developed at a rapid pace in the recent years.

With the advancement of display apparatuses, the number of types of contents that can be displayed on a display apparatus also increases. Particularly, three-dimensional (3D) display systems that provide 3D contents to viewers have been developed and provided.

A three-dimensional display apparatus may be realized not only as a 3D television that is widely used in general households but also as various types of display apparatuses such as monitors, mobile phones, personal digital assistants (PDAs), personal computers (PCs), set top PCs, tablet PCs, electronic picture frames, and kiosks and the like. Furthermore, the 3D display technology may be utilized in various industry fields that need 3D imaging such as in science, medicine, design, education, advertisement, and computer game and the like as well as at home.

The 3D display systems may include glassless systems where a viewer may view 3D contents without glasses and glass systems where a viewer needs to wear glasses to view the 3D contents.

The glass systems may provide satisfactory 3D effects but the viewer may experience inconvenience due to the need to wear glasses. On the other hand, the glassless systems have an advantage that viewers may view 3D images without glasses. Therefore, the glassless systems are continuously developed.

However, in a related art glassless system, a 3D image is rendered using a predetermined depth without considering a depth range of an input image. Accordingly, in the case where an input image has a large depth range, the 3D effect may deteriorate, and in the case where the input image has a small depth range, the sharpness of the image may deteriorate.

SUMMARY

One or more exemplary embodiments provide a glassless three-dimensional (3D) display apparatus configured to generate a 3D image using an output depth range determined based on a depth of an input image, and a control method thereof.

According to an aspect of an exemplary embodiment, there is provided a glassless three-dimensional (3D) display apparatus including: a storage configured to store information on a possible depth range providable by the glassless 3D display apparatus and information on a reference output depth range; a display configured to provide a plurality of image views having different viewpoints to a user; and a processor configured to render the plurality of image views having the different viewpoints based on a depth of an input image, to provide a multi-view image, wherein the processor is configured to adjust, based on the depth of the input image, at least one of a minimum value and a maximum value of the reference output depth range, within the possible depth range, to determine an output depth range corresponding to the input image, and render the plurality of image views based on the determined output depth range.

According to an aspect of another exemplary embodiment, there is provided a method for controlling a glassless 3D display apparatus, the method including: determining, based on a depth of an input image, an output depth range corresponding to the input image; and rendering a plurality of image views having different viewpoints in a predetermined arrangement pattern based on the determined output depth range, to provide a multi-view image, wherein the determining includes: obtaining a reference output depth range; and adjusting, based on the depth of the input image, at least one of a minimum value and a maximum value of the reference output depth range, within a possible depth range providable by the glassless 3D display apparatus, and determining the output depth range based on a result of the adjusting.

According to an aspect of still another exemplary embodiment, there is provided a multi-view image display apparatus including: a display configured to provide a plurality of image views having different viewpoints to a user; and a processor configured to adjust a depth of an input image and perform rendering of the plurality of image views based on the depth-adjusted image, to provide a multi-view image, wherein the processor is configured to adjust the depth of the input image based on a reference depth range, the reference depth range having a width that is changed according to a result of comparison between a depth range of the input image and the reference depth range.

BRIEF DESCRIPTION OF THE DRAWING FIGURES

The above and/or other aspects will be more apparent by describing certain example embodiments with reference to the accompanying drawings, in which:

FIG. 1 is a view for explaining operations of a multi-view image display apparatus;

FIGS. 2A, 2B, and 2C are views illustrating a configuration of a glassless three-dimensional (3D) display apparatus according to various exemplary embodiments;

Figure 7A:
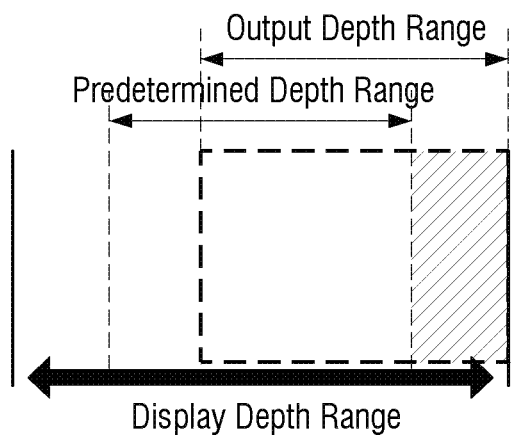
Figure 7B:
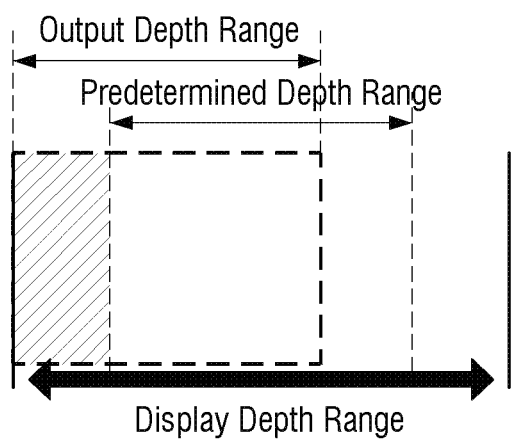
Figure 7C:
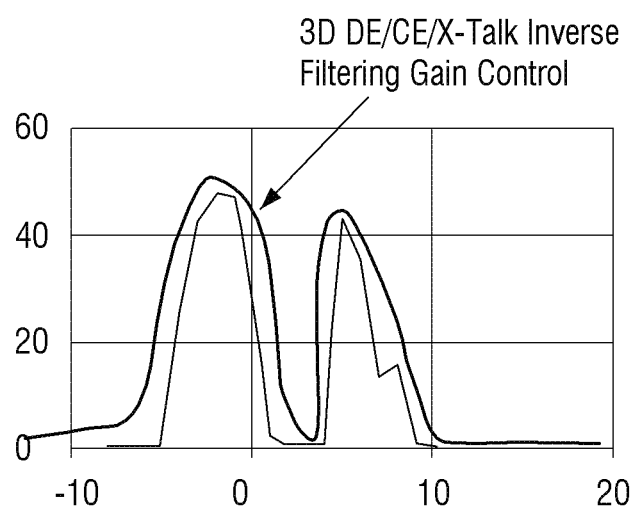
Figure 8:
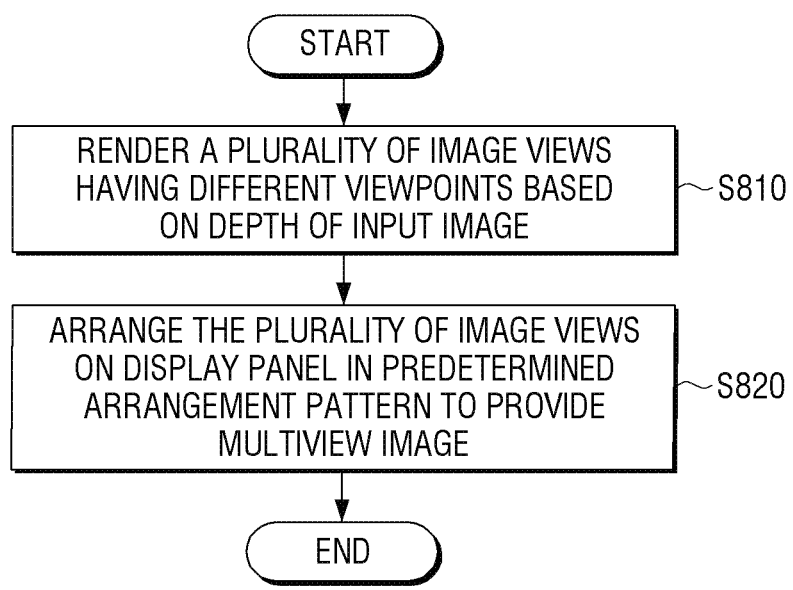

FIGS. 7A, 7B, and 7C are views for explaining a method for improving a contrast range, a detail, and a crosstalk of an image according to exemplary embodiments; and FIG. 8 is a flowchart for explaining a method for controlling a glassless 3D display apparatus according to an exemplary embodiment.

DETAILED DESCRIPTION

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 1:
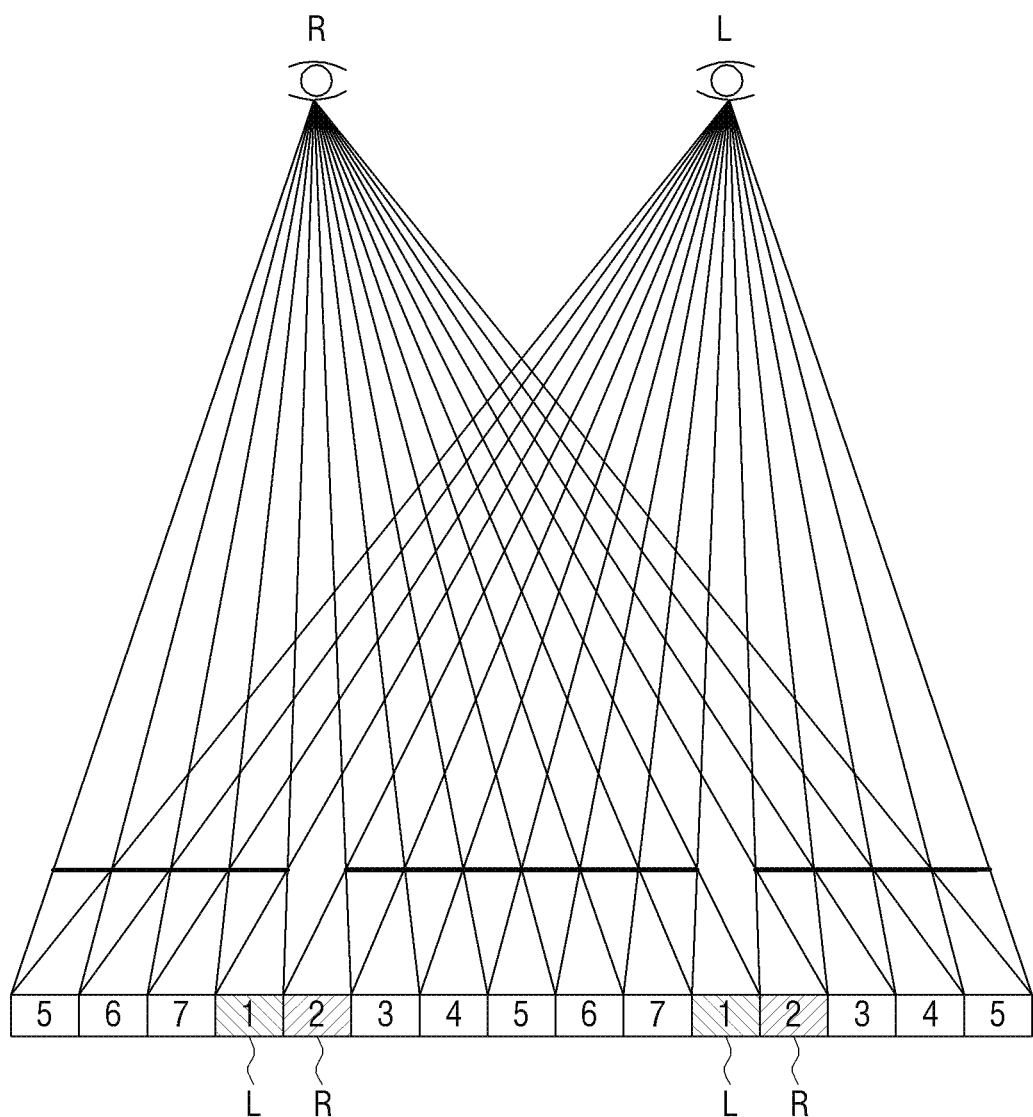

FIG. 1 is a view for explaining operations of a multi-view image display apparatus.

FIG. 1 illustrates a method of operating an apparatus that provides a three-dimensional (3D) image in a glassless method by displaying a multi-view image according to an exemplary embodiment. Herein, a multi-view image may be generated based on a plurality of images of the same object photographed in different angles. That is, the plurality of images photographed in different angles are refracted in different angles, and thus, the plurality of images are focused and provided at a position (for example, about 3 m) which is distant by a certain distance, which is so called a viewing distance. The position where such image is formed is called a viewing zone (or optical view). Accordingly, when a user's eye is positioned in a first viewing zone while the other eye is positioned in a second viewing zone, the user senses a 3D effect.

For example, FIG. 1 is a view for explaining display operations of a multi-view image having a total of seven viewpoints. Referring to FIG. 1, the glassless 3D display apparatus may enable light corresponding to a first viewpoint of the seven viewpoints to be projected to the left eye and enable light corresponding to a second viewpoint to be projected to the right eye. Accordingly, the user may view images of different viewpoints by the left eye and the right eye, thereby sensing the 3D effect.

Figure 2A:
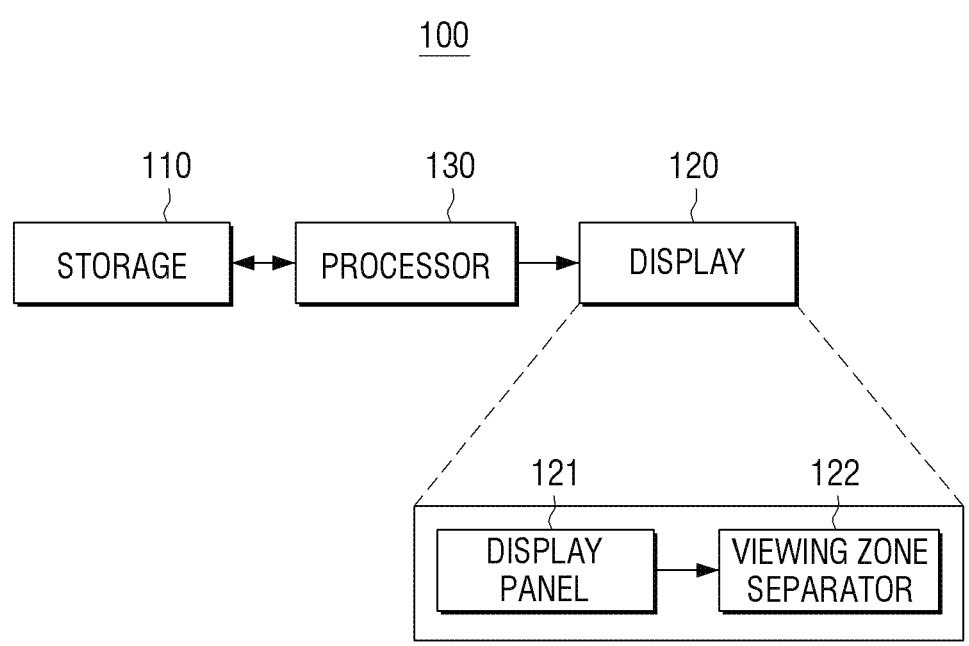
Figure 2B:
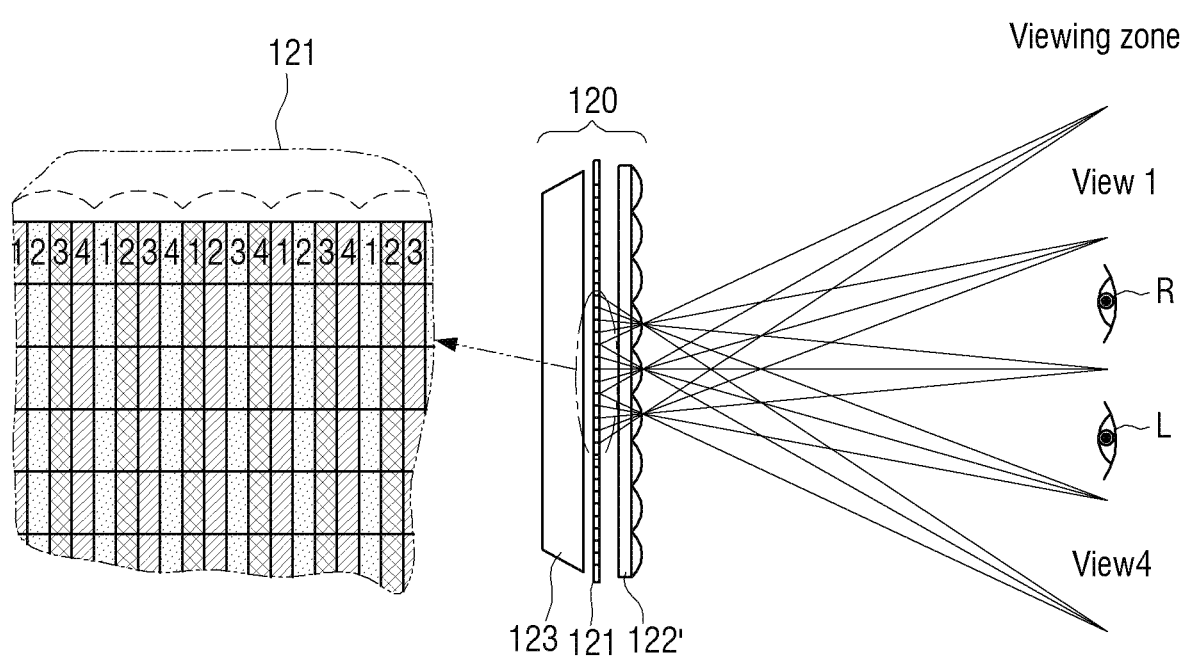
Figure 2C:
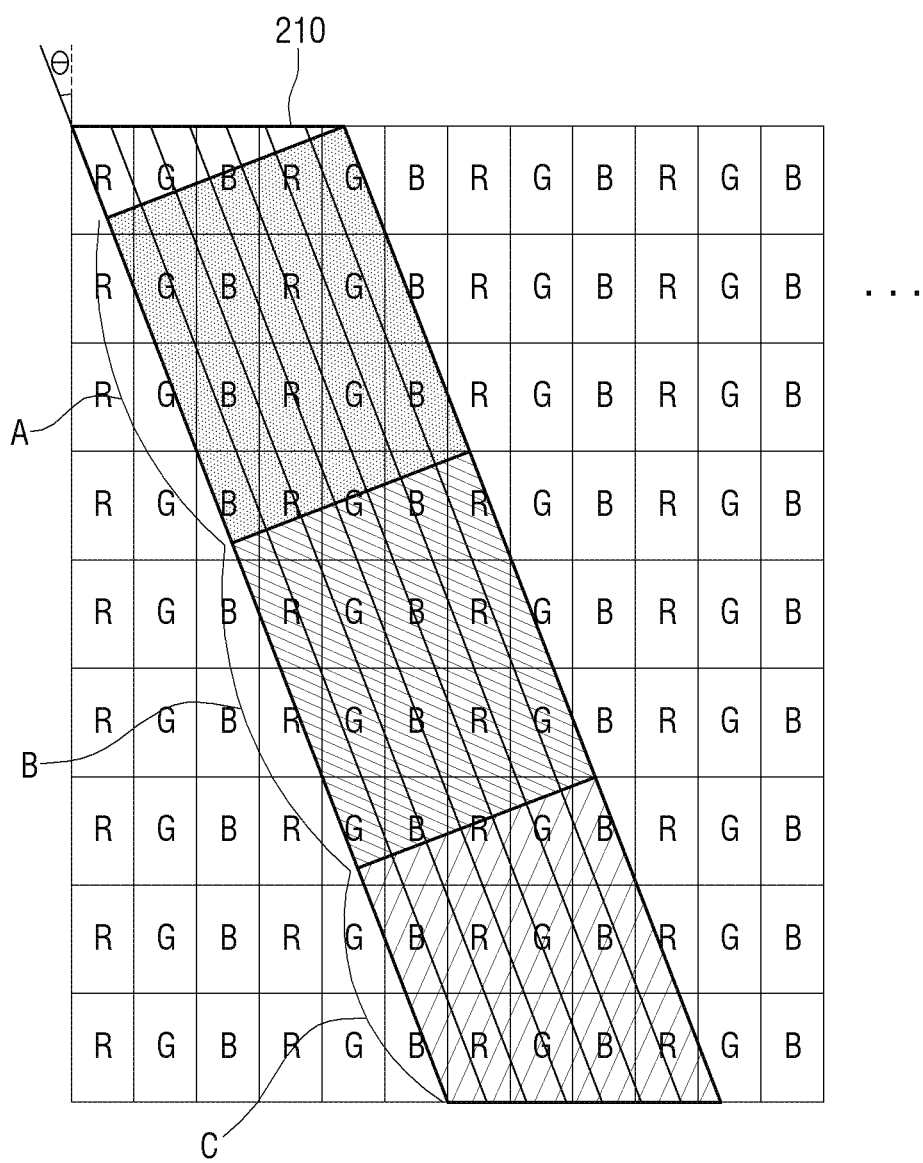

FIGS. 2A, 2B, and 2C are views illustrating a configuration of a glassless 3D display apparatus according to various exemplary embodiments.

Referring to FIG. 2A, the glassless 3D display apparatus 100 includes a storage 110, a display 120, and a processor 130.

The glassless 3D display apparatus 100 may include any one of various types of display apparatuses such as a television (TV), a monitor, a personal computer (PC), a kiosk, a tablet PC, an electronic picture frame, a mobile phone and the like.

An image inputter (not illustrated) of the 3D display apparatus 100 receives an image. More specifically, the image inputter may receive an image from various types of external apparatuses such as an external storage medium, a broadcasting station, a web server and the like. Herein, the received image may include any one of a single viewpoint image, a stereoscopic image, and a multi-view image. The single viewpoint image is an image photographed by a general photographing apparatus, and the stereoscopic image is a 3D video image photographed by a stereoscopic photographing apparatus and expressed by left eye images and light eye images only. A general stereoscopic photographing apparatus has two lenses and is used to photograph 3D images. Furthermore, the multi-view image means a 3D video image including images of various viewpoints photographed in various directions by one or more photographing apparatuses that have been geometrically corrected and spatially composed.

Furthermore, the image inputter may receive depth information of an image. In general, a depth of an image is a depth value given per pixel of the image. For example, a depth represented by 8 bits may have a grayscale value of 0 to 255. For example, in a reference of black and white, black (e.g., low depth value) may indicate an area far from a viewer, while white (e.g., high depth value) indicates an area close to the viewer.

Depth information refers to information on the depth of a 3D image. The depth information corresponds to an extent of difference between a left eye image and a right eye image that constitute the 3D image. The extent of 3D effect sensed by the viewer may vary depending on the depth information. That is, when the depth is great, the difference between the left eye and right eye is great, and thus the 3D effect sensed by the viewer may be relatively great, and when the depth is small, the difference between the left eye and right eye is small, and thus the 3D effect sensed by the viewer may be relatively small. The depth information may generally be obtained by using a passive method of using only two-dimensional (2D) characteristics of an image such as stereo matching or by using an active method of using equipment such as a depth camera. For example, the depth information may have a depth map format.

A depth map means a table that includes depth information of each area of an image. An area may be divided into pixel units or may be defined into units of predetermined areas each of which is greater than a pixel unit. In an example, a depth map may have a format where, of grayscales of 0 to 255, a grayscale of 127 or 128 is set as a reference that corresponds to a focal plane, a value smaller than 127 or 128 has a negative (−) value and a value greater than 127 or 128 has a positive (+) value. This is only an example and the reference value of the focal plane may be arbitrarily selected from grayscale values 0 to 255. Herein, a negative (−) value indicates a subsidence while a positive (+) value indicates a protrusion.

The storage 110 stores information on a depth range (or realizable depth range or possible depth range) that can be realized in the glassless display apparatus 100 and information on a predetermined output depth range (or reference output depth range). More specifically, the storage 110 may store a depth range that may be realized in the glassless 3D display apparatus 100 according to the characteristics of the glassless 3D display apparatus 100 and store information on a predetermined output depth range that may provide an optimal 3D image in the glassless 3D display apparatus 100. Herein, the predetermined output depth range may be determined at a manufacturing operation of the glassless 3D display apparatus 100 in consideration of the depth range that may be realized in the glassless 3D display apparatus 100 and the size of a display panel of the glassless 3D display apparatus 100. However, there is no limitation thereto, and thus the predetermined output depth range may be any value set by the user.

The display 120 performs a function of providing a plurality of optical views (or viewing zones). For this purpose, the display 120 includes a display panel 121 and viewing zone separator 122 for providing the plurality of optical views.

The display panel 121 includes a plurality of pixels including a plurality of sub pixels. Herein, a sub pixel may include R (Red), G (Green) and B (Blue). That is, pixels including sub pixels of red (R), green (G), and blue (B) may be arranged in a plurality of lines and columns to constitute the display panel 121. In such a case, the display panel 121 may be realized as any one of various display units such as a liquid crystal display (LCD) panel, a plasma display panel (PDP), an organic light emitting diode (OLED), a vacuum fluorescent display (VFD), a field emission display (FED), and an electro luminescence display (ELD) and the like.

Although not illustrated in FIG. 2A, in the case where the display panel 121 is realized as an LCD panel, the display apparatus 100 may further include a backlight unit (not illustrated) configured to supply backlight to the display panel 121, and a panel driver (not illustrated) configured to drive pixels of the display panel 121 according to a value of each of the pixels that constitute an image frame.

The viewing zone separator 122 may be arranged on a front surface of the display panel 121 and provide different viewpoints per viewing zone, that is, an optical view. In this case, the viewing zone separator 122 may be realized as a lenticular lens or parallax barrier.

For example, the viewing zone separator 122 may be realized as a lenticular lens that includes a plurality of lens areas. Accordingly, the lenticular lens may refract an image being displayed on the display panel 121 through the plurality of lens areas. Each lens area may be formed to have a size corresponding to at least one pixel, and may disperse the light passing each pixel differently per viewing zone.

In another example, the viewing zone separator 122 may be realized as a parallax barrier. The parallax barrier is realized as a transparent slit array that includes a plurality of barrier areas. Accordingly, the light may be blocked by a slit between the barrier areas so that an image of different viewpoint may be projected per viewing zone.

FIG. 2B will be explained based on an example where the viewing zone separator 122 is realized as a lenticular lens array, and the display panel 121 is realized as an LCD panel according to an exemplary embodiment.

Referring to FIG. 2B, the display 120 includes a display panel 121, a lenticular lens array 122', and a backlight unit 123.

Referring to FIG. 2B, the display panel 121 includes a plurality of pixels that may be divided into a plurality of columns. In each column, an image view of a different viewpoint is arranged. FIG. 2B illustrates a state where a first to a fourth views that are a plurality of image views of different viewpoints are repeatedly arranged sequentially. That is, each pixel column is arranged in groups numbered 1, 2, 3, and 4.

The backlight unit 123 provides light to the display panel 121. By the light provided from the backlight unit 123, each image view formed on the display panel 121 is projected to the lenticular lens array 122', and the lenticular lens array 122' disperses the projected light of each image view to be transmitted towards the direction of the user. That is, the lenticular lens array 122' generates exit pupils in the position of the user, that is, at the viewing distance. The thickness and diameter of the lenticular lens when realized as a lenticular lens array, and the slit interval when realized as a parallax barrier may be designed such that the exit pupils generated by each column are separated by an average central distance between both eyes of not more than 65 mm. The separated image light each constitutes an optical view. That is, as illustrated in FIG. 2B, in a viewing zone, a plurality of optical views are formed, and when the left eye and the right eye of the user are positioned in different optical views, the user may view a 3D image.

The viewing zone separator 122 may be slanted by a certain angle θ with respect to a column direction, to improve the picture quality. The processor 130 may divide each of the plurality of views based on the slanted angle of the viewing zone separator 122, and combine the plurality of views to generate a multi-view image frame to be output. Accordingly, the user may view an area that is slanted to a certain direction instead of an image displayed on an entire column or row of sub pixels in a vertical or horizontal direction of the display panel 121. Accordingly, for at least some pixels, the viewer may view a portion of the sub pixel instead of one complete sub pixel. For example, as illustrated in FIG. 2C, the user may view an area 210 slanted in a predetermined angle by the viewing zone separator 122. Particularly by the optical operations of the viewing zone separator 122, the user may view a pixel area of the slanted area (or a visible pixel area). In this case, the size of the pixels (or pixel groups) A, B, C provided in the visible pixel area may be determined by a pitch of the lenticular lens.

The processor 130 controls the overall operations of glassless 3D display apparatus 100.

The processor 130 may render a plurality of image views of different viewpoints.

More specifically, in response to an input image being a 2D image, the processor 130 may render a plurality of image views of different viewpoints based on the depth information extracted from 2D/3D conversion. Alternatively, in response to a plurality of image views of different viewpoints and a plurality of depth information being input, the processor 130 may render N number (N being a natural number) of image views based on at least one image view and depth information of the plurality of input image views. Alternatively, in response to a plurality of image views of different viewpoints being input, the processor 130 may extract depth information from the plurality of image views, and render the N number of image views based on the extracted depth information.

For example, the processor 130 may select a 3D image, that is, one of a left eye image and a right eye image as a reference view (or center view) and generate a leftmost view and a rightmost view that may be used to generate the multi-view image. In this case, the processor 130 may generate a leftmost view and a rightmost view based on the corrected depth information corresponding to one of the left eye image and the right eye image that has been selected as the reference view. In response to the leftmost view and the rightmost view being generated, the processor 130 renders the N image views by generating a plurality of interpolation views between the center view and the leftmost view, and generating a plurality of interpolation views between the center view and the rightmost view. However, there is no limitation thereto, and thus the processor 130 may adjust the depth of an image input based on the depth information according to various standards, and in this case the processor 130 may render a plurality of image views based on an image of which the depth has been adjusted.

In this case, within a realizable depth range stored in the storage 110 based on the depth of the input image, the processor 130 may shift at least one of a minimum value and a maximum value of a predetermined output depth range, and determine whether the output depth range corresponds to the input image.

In an exemplary embodiment, in response to the size of a depth range of an input image being greater than the size of the predetermined output depth range, the processor 130 may set, within the realizable depth range stored in the storage 110, the size of the output depth range corresponding to the input image to be greater than the predetermined output depth range, and determine the output depth range.

More specifically, in response to the size of the depth range of the input image being greater than the predetermined output depth range by a predetermined threshold value or more, the processor 130 may set, within the realizable depth range, the size of the output depth range corresponding to the input image to be greater than the size of the predetermined output depth range, and determine the output depth range. For example, in the case of the predetermined output depth range being −10~+10 the depth range of the input image being −20~+20, and the threshold value being 10, the size, i.e., 40, of the depth range of the input image is greater than the size, i.e., 20, of predetermined depth range by a degree greater than the threshold value, i.e., 10. In this case, the size of the output depth range may be set to be greater than the size of the predetermined output depth range. Still, the output depth range may be determined within the realizable depth range stored in the storage 110. That is, the minimum value of the output depth range may be equal to or greater than the minimum value of the realizable depth range stored in the storage 110, and the maximum value of the output depth range may be equal to or smaller than the maximum value of the realizable depth range stored in the storage 110.

In another example, in the case of the predetermined output depth range being −10~+10, the depth range of the input image being −13~+13, and the threshold value being 10, the difference between the size, i.e., 26, of the depth range of the input image and the size, i.e., 20, of the predetermined output depth range is smaller than the threshold value, and therefore, the size of the output depth range may be set to be the same as the size of the predetermined depth range.

Furthermore, in the case of the size of the depth range of the input image being greater than the size of the predetermined output depth range, the processor 130 may set, within the realizable depth range, the size of the output depth range corresponding to the input image to be greater than the predetermined output depth range by a predetermined degree determined based on the difference between the size of the depth range of the input image and the size of the predetermined output depth range. For example, in the case of the predetermined output depth range being −10~+10, the depth range of the input image being −20~+20, and the degree by which the output depth range increases based on the difference between the size of the depth range of the input image and the size of the predetermined output depth range being 0.1×(a size difference between the input depth range and the predetermined output depth range), the difference between the size of 40 of the depth range of the input image and the size of 20 of the predetermined output depth range is 20, and thus the size of the output depth range may increase by a degree of 2. That is, the output depth range may be set to −11~+11. However, the output depth range may be determined within the realizable depth range stored in the storage 110.

Furthermore, when the output depth range is determined, the processor 130 may remap the depth of the input image based on the determined output depth range. More specifically, in response to the size of the output depth range being set to be greater than the size of the predetermined output depth range, the depth of each pixel may be determined again such that the difference of the depth corresponding to each pixel of the input image becomes greater, and the determined depth may be mapped to each pixel of the input image. In this case, the processor 130 may determine the depth corresponding to each pixel of the input image in consideration of object information of the input image. The object information indicates information on an object of the input image, e.g., information on a pixel included in the object.

Furthermore, the processor 130 may remap the depth of the input image within the output depth range determined by the processor 130 based on the object information of the input image, and render a plurality of image views based on the remapped depth.

More specifically, in response to the difference between the pixel value of a certain area and the pixel value of an adjacent area in an input image being a predetermined threshold pixel value or more and the remapped depth corresponding to the certain area being a predetermined threshold depth or more, the processor 130 may change the remapped depth corresponding to the certain area to the predetermined threshold depth. In response to the difference between the pixel value of the certain area and the pixel value of the adjacent area in the input image being the predetermined threshold pixel value or more, and the remapped depth corresponding to the certain area being the predetermined threshold depth or more, the processor 130 may predict the certain area as an area where much crosstalk may be generated, and change the remapped depth corresponding to the certain area to the predetermined threshold depth. Herein, the predetermined threshold depth may be determined to be a value that may minimize the crosstalk according to an exemplary embodiment, and may be determined by experiments.

Furthermore, in response to the size of the depth range of the input image being smaller than the size of the predetermined output depth range, the processor 130 may remap the depth of the input image based on reliability information of the input image, and render a plurality of image views based on the remapped depth. Herein, the reliability information includes a reliability value that represents the extent of reliability of the depth of the certain pixel or certain area, and the reliability information may be included in an image signal and transmitted to the glassless 3D display apparatus 100.

More specifically, in an area of the input image where the reliability value is the predetermined threshold value or greater, the processor 130 may adjust the depth based on the predetermined output depth range, and in an area of the input image where the reliability value is smaller than the predetermined threshold value, the processor 130 may the depth of the input image and render a plurality of image views based on the determined depth.

The processor 130 generates a multi-view image to be displayed on the display 120 based on the sub pixel values that constitute a plurality of rendered image views of different viewpoints. Herein, the processor 130 may include one or more of a central processing unit (CPU), an application processor (AP), and a communication processor (CP).

Particularly, the processor 130 may render a plurality of image views having different viewpoints based on the depth of the input image, and arrange the plurality of image views on the display panel 121 in a predetermined arrangement pattern to provide a multi-view image.

Furthermore, the processor 130 may remap the depth of the input image within the output depth range determined by the processor 130 based on the object information of the input image, map a mixed pixel value generated based on the pixel value of a certain area and the pixel value of an adjacent area in the input image to the certain area based on the remapped depth and generate a multi-view image. In this case, the processor 130 may obtain the mixed pixel value in a sub pixel unit of one of R, G, and B, and map the obtained mixed pixel value to the certain area and generate the multi-view image. For example, in the case of obtaining the mixed pixel value to be mapped to an R sub pixel at a position of (1, 1) of the multi-view image to be displayed on the display panel 121, the processor 130 may obtain the mixed pixel value by mixing the R sub pixel value at the position of (1, 1) of a first viewpoint view and the R sub pixel value of the position of (1, 1) at least one adjacent point viewpoint view.

Figure 3A:
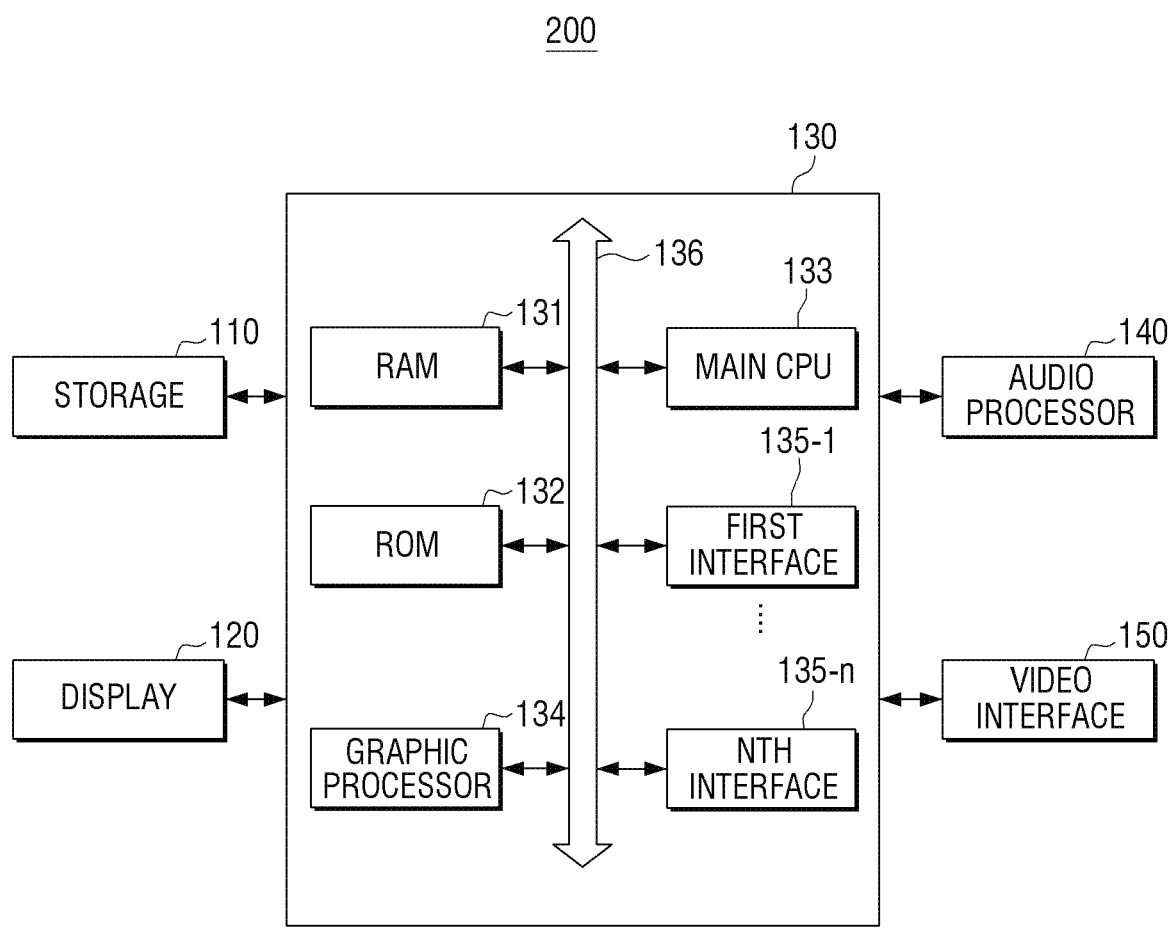
FIGS. 3A and 3B are block diagrams illustrating a configuration of a glassless 3D display apparatus according to exemplary embodiments.
Figure 3B:
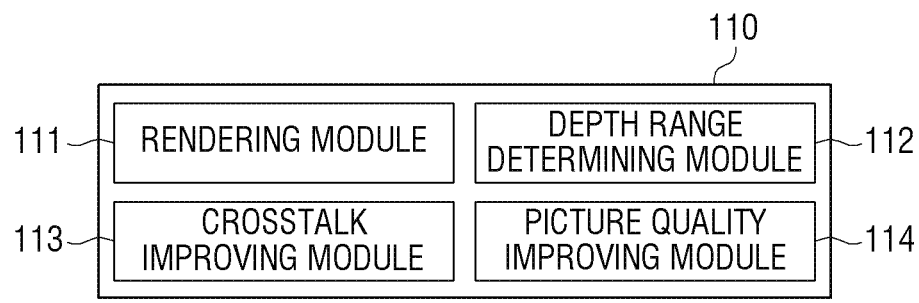

FIGS. 3A and 3B are block diagrams illustrating a configuration of a glassless 3D display apparatus according to exemplary embodiments.

Referring to FIG. 3A, the glassless 3D display apparatus 200 includes a storage 110, a display 120, a processor 130, an audio processor 140 and a video processor 150. The above components may be applied to the glassless 3D display apparatus 100 illustrated in FIG. 2A. Because the components of FIG. 3A that have already been explained with reference to FIG. 2A, repeated explanation will be omitted.

The processor 130 includes a random access memory (RAM) 131, a read only memory (ROM) 132, a main CPU 133, a graphic processor 134, a first to an nth interface 135-1 to 135-*n*, and a bus 136.

The RAM 131, the ROM 132, the main CPU 133, the graphic processor 134, and the first to nth interface 135-1 to 135-*n* may be connected to one another via the bus 136.

The first to nth interface 135-1 to 135-*n* are connected to the various aforementioned components. One of the interfaces may be a network interface that is connected to an external apparatus via a network.

The main CPU 133 accesses the storage 110, and performs a booting using an operating system (O/S) stored in the storage 110. In addition, the main CPU 133 may perform various operations using various modules, various programs, contents, and data stored in the storage 110. Particularly, the main CPU 133 may perform operations according to various exemplary embodiments based on a rendering module 111, a depth range determining module 112, a crosstalk improving module 113, and a picture quality improving module 114, as illustrated in FIG. 3B.

In the ROM 132, sets of commands for booting a system are stored. In response to a turn-on command being input and power being supplied, the main CPU 133 copies the O/S stored in the storage 110 to the RAM 131 according to a command stored in the ROM 132, and executes the O/S to boot the system. In response to the booting being completed, the main CPU 133 copies various programs stored in the storage 110 to the RAM 131, and executes the programs copied in the RAM 131 to perform various operations.

The graphic processor 134 generates a screen that includes various objects such as an icon, an image, and a text and the like using an arithmetic operator (not illustrated) and renderer (not illustrated). The arithmetic operator obtains an attribute value such as a coordinate value, a format, a size, a color and the like regarding each object to be displayed according to a layout of a screen based on a received control command. The renderer generates a screen of any one of various layouts that includes an object based on the attribute value obtained in the arithmetic operator.

Operations of the aforementioned processor 130 may be performed by a program stored in the storage 110.

The storage 110 stores various data such as an O/S software module for driving the glassless 3D display apparatus 200 and various multimedia contents. Particularly, in the storage 110, programs such as the rendering module 111, the depth range determining module 112, the crosstalk improving module 113, the picture quality improving module 114 and the like illustrated in FIG. 3B and various information for realizing various exemplary embodiments may be stored.

Figure 4A:
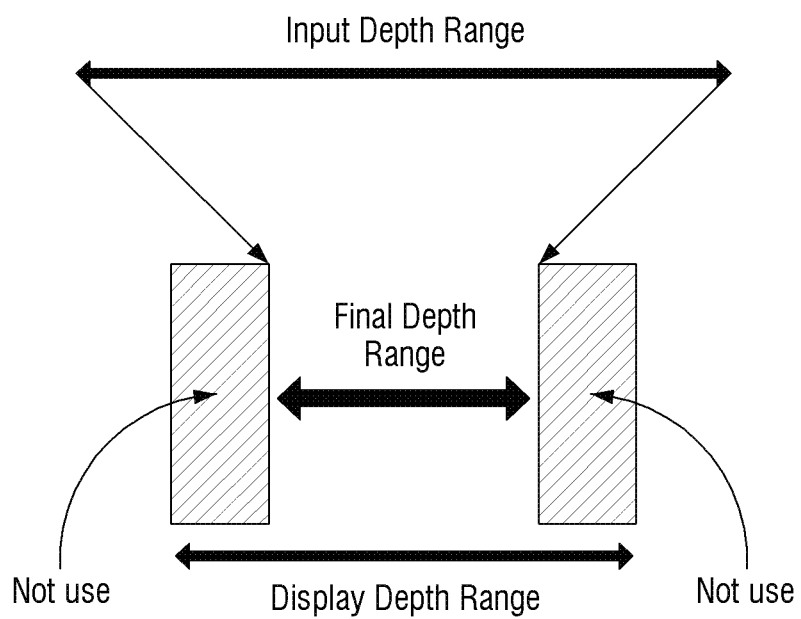
FIGS. 4A and 4B are views for explaining a method for determining an output depth range of an image according to exemplary embodiments.
Figure 4B:
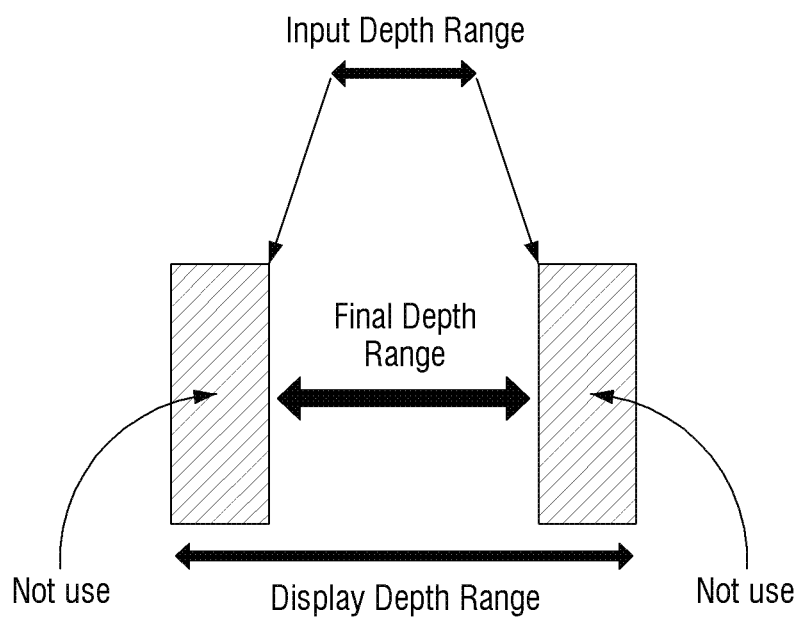

FIGS. 4A and 4B are views for explaining a method for determining an output depth range according to exemplary embodiments.

In response to the size of the depth range of the input image being different from the size of the predetermined output depth range, the glassless 3D display apparatus adjusts the depth of the input image such that the output depth range (or final depth range) is within the predetermined output depth range. In this case, as illustrated in FIG. 4A, in response to the size of the depth range of the input image being greater than the size of the predetermined depth range, it is possible to compress the depth of the input image, and as illustrated in FIG. 4B, in response to the size of the depth range of the input image being smaller than the size of the predetermined output depth range, it is possible to expand the depth of the input image. However, as can be seen from FIGS. 4A and 4B, the size of the final depth range is smaller than the size of the depth range (or display depth range) realizable in the glassless 3D display apparatus, and thus there exists a depth area that is not used.

In the case of adjusting the depth of the output image based on the predetermined output depth range, the glassless 3D display apparatus according to an exemplary embodiment may use the depth area not being used. A detailed description of a method of using a full range of the depth area according to an exemplary embodiment will be made with reference to FIGS. 5A and 5B.

Figure 5A:
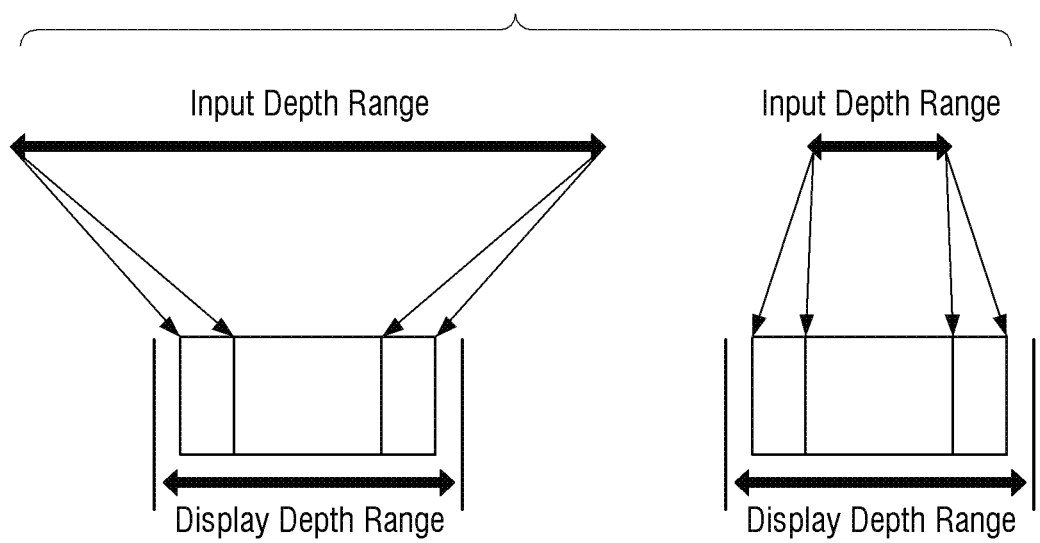
FIGS. 5A and 5B are views for explaining a method for determining an output depth range of an image according to exemplary embodiments.
Figure 5B:
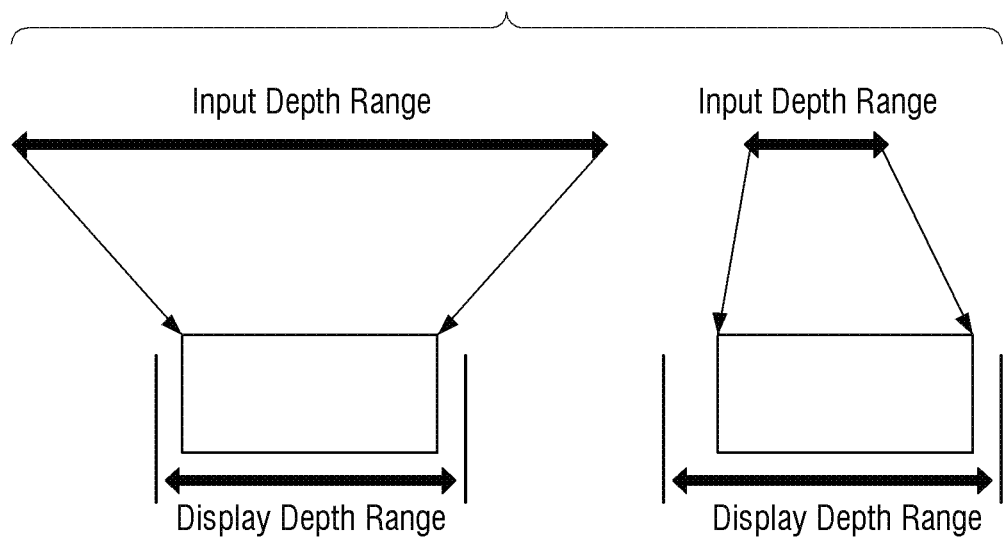

FIGS. 5A and 5B are views for explaining a method for determining an output depth range according to exemplary embodiments.

Referring to FIGS. 5A and 5B, in response to the size of a depth range of an input image being greater or smaller than the size of a predetermined output depth range, the glassless 3D display apparatus may shift at least one of a minimum value or a maximum value of the predetermined output depth range to determine an output depth range corresponding to the input image.

More specifically, in response to the size of the depth range of the input image being greater than the size of the predetermined depth range, it is possible to set, within a depth range realizable in the glassless 3D display apparatus, the size of the output depth range corresponding to the input image to be greater than the size of the predetermined output depth range and determine the output depth range.

For example, in response to the size of the depth range of an input image being greater than the size of a predetermined output depth range by a predetermined threshold value or more, it is possible to set, within a realizable depth range, the size of the output depth range corresponding to the input image to be greater than the size of the predetermined output depth range and determine the output depth range. In this case, the output depth range may be determined in consideration of a depth distribution in the input image. More specifically, in response to a great number of depths being included in the input image, it is possible to adjust the output depth range by using a method of shifting the maximum value of the predetermined output depth range to a greater value and not shifting the minimum value of the predetermined output depth range. Alternatively, in response to a small number of depths being included in the input image, it is possible to adjust the output depth range by shifting the minimum value of the predetermined output depth range to a smaller value, and not shifting the maximum value of the predetermined output depth range. According to exemplary embodiments, the output depth range may be determined by adjusting only the minimum value or the maximum value of the predetermined depth range or adjusting both the maximum value and minimum value of the predetermined output depth range based on the depth distribution of the input image.

In another example, based on the difference between the size of the depth range of the input image and the predetermined output depth range, it is possible to set, within the realizable depth range, the size of the output depth range to be greater than the predetermined output depth range by a predetermined degree. In this case, the output depth range may adjust the output depth range by shifting the minimum value or the maximum value of the predetermined output depth range by the predetermined degree or by shifting both the minimum value and maximum value of the predetermined output depth range by the predetermined degree.

Furthermore, in response to the size of the depth range of the input image being smaller than the size of the predetermined output depth range, it is possible to remap the depth of the input image based on the reliability information of the input image, and render a plurality of image views based on the remapped depth. More specifically, in an area where the reliability value of the input image is a predetermined threshold value or more, it is possible to adjust the depth based on the predetermined output depth range, and in an area where the reliability value of the input image is less than the predetermined threshold value, it is possible to not to adjust the depth based on the predetermined output range and render a plurality of image views based on the depth determined by applying the depth of the input image.

Figure 6:
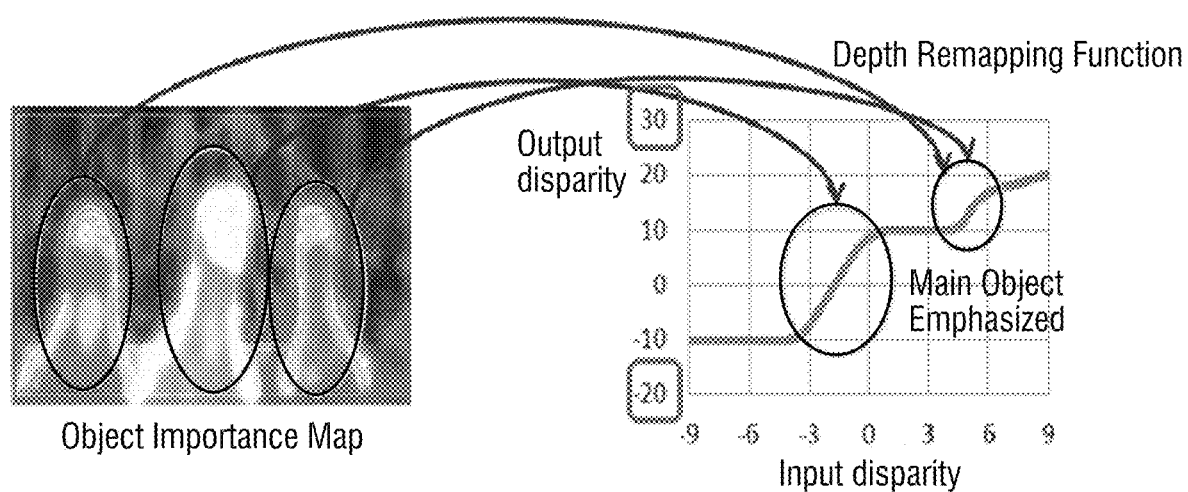
FIG. 6 is a view for explaining a method for remapping a depth of an input image based on object importance information according to an exemplary embodiment.

FIG. 6 is a view for explaining a method for remapping a depth of an input image based on object importance information according to an exemplary embodiment.

Referring to FIG. 6, the glassless 3D display apparatus may generate an object importance map where an importance value of each object of an input image is mapped, or receive object importance information where the object importance map is included together with an image signal.

According to an exemplary embodiment, the glassless 3D display apparatus may remap the depth of the input image using the object importance map. More specifically, it is possible to increase the depth of an object having a great object importance value, thereby increasing the 3D effect to emphasize an important object compared to other objects.

That is, in response to the size of the depth range of the input image being greater than the size of the predetermined output depth range, the glassless 3D display apparatus according to an exemplary embodiment may determine the depth of the output image in consideration of the object importance value.

FIGS. 7A, 7B, and 7C are views for explaining a method for improving a contrast range, a detail, and a crosstalk and the like according to exemplary embodiments.

As aforementioned, within the depth range realizable in the glassless 3D display apparatus, the output depth range may be set to be different from the predetermined depth range. More specifically, as illustrated in FIG. 7A, within the output depth range (or display depth range) where the depth of the output image is realizable, in the case where the output depth range is set to have a value greater than the maximum value of the predetermined output depth range, in response to the difference between the pixel value of a certain area and the pixel value of an adjacent area being the predetermined threshold pixel value or more, and the remapped depth corresponding to the certain area being the predetermined threshold depth or more, it is possible to change the remapped depth corresponding to the certain area to the predetermined threshold depth and improve the crosstalk. Furthermore, it is possible to map a mixed pixel value generated based on the pixel value of the certain area and the pixel value of the adjacent area in the input image, and improve the contrast range and the detail.

On the other hand, as illustrated in FIG. 7B, in response to the depth of the output image being set to have a value smaller than the minimum value of the predetermined output depth range within the realizable output depth range, it is possible to remap the depth of the input image based on the reliability information without improving the crosstalk, contrast range and details.

The graph of FIG. 7C illustrates results of the picture quality of a 3D image obtained by improving the contrast range, details and crosstalk according to an exemplary embodiment.

FIG. 8 is a flowchart for explaining a method for controlling the glassless 3D display apparatus according to an exemplary embodiment.

According to the method for controlling the glassless 3D display apparatus illustrated in FIG. 8, a plurality of image views having different viewpoints are rendered based on the depth of an input image (S810). Herein, the glassless 3D display apparatus may include a display that includes a display panel, and a viewing zone separator arranged on a front surface of the display panel and configured to provide optical views of different viewpoints in a viewing zone of the user. In this case, within the realizable depth range predetermined based on the depth of the input image, it is possible to shift at least one of a minimum value and a maximum value of the predetermined output depth range to determine the output depth range corresponding to the input image, and render the plurality of image views based on the determined output depth range.

Next, the plurality of rendered image views are arranged on the display panel in a predetermined arrangement pattern to provide a multi-view image (S820).

Furthermore, at S810, in response to the size of the depth range of the input image being greater than the size of the predetermined output depth range, it is possible to set, within the realizable depth range, the size of the output depth range corresponding to the input image to be greater than the predetermined output depth range and determine the output depth range.

At S810, in response to the size of the depth range of the input image being greater than the predetermined output depth range by the predetermined threshold value or more, it possible to set, within the realizable depth range, the size of the output depth range corresponding to the input image to be greater than the predetermined output depth range, and determine the output depth range. Furthermore, at S810, in response to the size of the depth range of the input image being greater than the size of the predetermined output depth range, it is possible to set the size of the output depth range corresponding to the input image to be greater than the size of the predetermined output depth range by the predetermined degree and determine the output depth range within the realizable depth range based on the difference between the size of the depth range of the input image and the size of the predetermined output depth range.

Furthermore, at S810, it is possible to remap the depth of the input image within the determined depth range based on the object information of the input image, and render a plurality of image views based on the remapped depth.

Furthermore, at S810, in response to the difference between the pixel value of a certain area and the pixel value of an adjacent area being the predetermined threshold pixel value or more and the remapped depth corresponding to the certain area being the predetermined threshold depth or more, it is possible to change the remapped depth corresponding to the certain area to the predetermined threshold depth.

Furthermore, at S820, based on the remapped depth, it is possible to provide a multi-view image generated by mapping a mixed pixel value generated based on the pixel value of the certain area and the pixel value of the adjacent area in the input image to the certain area.

Furthermore, the controlling method may further include obtaining the mixed pixel value in a sub pixel unit of one of R, G, and B.

Furthermore, at S810, in response to the size of the depth range of the input image being smaller than the size of the predetermined output depth range, it is possible to remap the depth of the input image based on the reliability information of the input image, and render a plurality of image views based on the remapped depth.

Furthermore, at S810, in an area of the input image where the reliability value is the predetermined threshold value or more, it is possible to adjust the depth based on the predetermined output depth range, and in an area of the input image where the reliability value of the input image is less than the predetermined threshold value, it is possible to render a plurality of image views based on the depth determined by directly applying the depth of the input image.

As aforementioned, according to various exemplary embodiments, it is possible to improve the 3D effect and the picture quality of a 3D image provided by a glassless display system.

The method for controlling the glassless 3D display apparatus according to various exemplary embodiments may be realized as a program and provided to the glassless 3D display apparatus.

For example, a program that, when executed by a computer, causes the computer to perform an operation of rendering a plurality of image views having different viewpoints based on the depth of the input image and an operation of arranging the plurality of image views on the display panel in a predetermined arrangement pattern and providing a multi-view image may be stored in a non-transitory computer readable medium and provided to the glassless 3D display apparatus.

A non-transitory computer readable medium refers to a medium readable by a computer and that is configured to store data semi-permanently and not for a short period of time such as a register, a cache, and a memory. More specifically, the aforementioned various applications or programs may be stored in a non-transitory computer readable medium such as a compact disc (CD), a digital versatile disc (DVD), a hard disc, a Blueray disc, a universal serial bus (USB), a memory card, and a ROM.

At least one of the components, elements or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in some of the block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Although a few embodiments have been shown and described, it would be appreciated by those skilled in the art that changes may be made in the exemplary embodiments without departing from the principles and spirit of the disclosure, the scope of which is defined in the claims and their equivalents.

What is claimed is:

1. A glassless three-dimensional (3D) display apparatus comprising:
   a storage configured to store information on a possible depth range providable by the glassless 3D display apparatus and information on a reference output depth range;
   a display configured to provide a plurality of image views having different viewpoints to a user; and
   a processor configured to render the plurality of image views having the different viewpoints based on a depth of an input image, to provide a multi-view image,
   wherein the processor is configured to adjust, based on the depth of the input image, at least one of a minimum value and a maximum value of the reference output depth range, within the possible depth range, to determine an output depth range corresponding to the input image, and render the plurality of image views based on the determined output depth range,
   wherein, in response to a size of a depth range of the input image being greater than a size of the reference output depth range, the processor is configured to determine the output depth range such that the output depth range, within the possible depth range, has a size greater than the size of the reference output depth range,
   wherein the size of the reference output depth range is smaller than a size of the possible depth range,
   wherein, based on a depth of a certain area of the input image being greater than or equal to a threshold depth, the processor is further configured to:

remap the depth of the certain area of the input image based or object information and the determined output depth range, and in response to a difference between a first pixel value of the certain area and a second pixel value of an adjacent area in the input image being greater than or equal to a threshold pixel value, remap the depth of the certain area to a predetermined threshold depth, wherein the processor is further configured to remap the depth of the input image based on the determined output depth range and the object information of the input image, the object information including an object importance map assigning importance values to a plurality of objects in the input image, and wherein a depth of one of the plurality of objects in the input image is adjusted based on the importance values.

2. The apparatus according to claim 1, wherein, in response to determining that the size of the depth range of the input image is greater than the size of the reference output depth range by a threshold or more, the processor is further configured to determine the output depth range such that the output depth range, within the possible depth range, has the size greater than the size of the reference output depth range.

3. The apparatus according to claim 1, wherein, in response to the size of the depth range of the input image being greater than the size of the reference output depth range, the processor is further configured to determine the output depth range such that the output depth range, within the possible depth range, has the size greater than the size of the reference output depth range by a predetermined degree, wherein the predetermined degree is determined based on a difference between the size of the depth range of the input image and the size of the reference output depth range.

4. The apparatus according to claim 1, wherein the processor is further configured to provide the multi-view image in which the certain area of the input image is mapped to a mixed pixel value generated based on the pixel value of the certain area and the pixel value of the adjacent area in the input image.

5. The apparatus according to claim 4, wherein the processor is further configured to obtain the mixed pixel value corresponding to a sub pixel unit of one of red (R), green (G), and blue (B) sub pixels.

6. The apparatus according to claim 1, wherein, in response to the size of the depth range of the input image being smaller than the size of the reference output depth range, the processor is further configured to remap the depth of the input image based on reliability information of the input image, the reliability information comprising a reliability value indicating an extent of reliability of the depth of the input image, and render the plurality of image views based on the remapped depth.

7. The apparatus according to claim 6, wherein, based on a first area of the input image having a reliability value of a threshold or more, the processor is further configured to remap the depth of the first area based on the reference output depth range, and based on a second area of the input image having a reliability value less than the threshold, the processor is further configured to determine the depth of the second area without using the reference output depth range.

8. A method for controlling a glassless 3D display apparatus, the method comprising:

determining, based on a depth of an input image, an output depth range corresponding to the input image; and rendering a plurality of image views having different viewpoints based on the determined output depth range, to provide a multi-view image, wherein the determining comprises:

obtaining a reference output depth range;

adjusting, based on the depth of the input image, at least one of a minimum value and a maximum value of the reference output depth range, within a possible depth range providable by the glassless 3D display apparatus, and determining the output depth range based on a result of the adjusting; and determining the output depth range based on the result of the adjusting comprises, in response to a size of a depth range of the input image being greater than a size of the reference output depth range, determining the output depth range such that the output depth range, within the possible depth range, has a size greater than the size of the reference output depth range, wherein the size of the reference output depth range is smaller than a size of the possible depth range, wherein the determining the output depth range based on the result of the adjusting further comprises, in response to a depth of a certain area of the input image being greater than or equal to a threshold depth, remapping the depth of the certain area of the input image based on object information and the determined output depth range, and in response to a difference between a pixel value of the certain area and a pixel value of an adjacent area in the input image being greater than or equal to a threshold pixel value, remapping the depth of the certain area to a predetermined threshold depth, wherein the determining the output depth range based on the result of the adjusting comprises remapping the depth of the input image based on the determined output depth range and further based on object information of the input image, the object information including an object importance map assigning importance values to a plurality of objects in the input image, and wherein a depth of one of the plurality of objects in the input image is increased based on the importance values.

9. The method according to claim 8, wherein the determining the output depth range based on the result of the adjusting further comprises, in response to determining that the size of the depth range of the input image is greater than the size of the reference output depth range by a threshold or more, determining the output depth range such that the output depth range, within the possible depth range, has the size greater than the size of the reference output depth range.

10. The method according to claim 8, wherein the determining the output depth range based on the result of the adjusting further comprises, in response to the size of the depth range of the input image being greater than the size of the reference output depth range, determining the output depth range such that the output depth range, within the possible depth range, has the size greater than the size of the reference output depth range by a predetermined degree, wherein the predetermined degree is determined based on a difference between the size of the depth range of the input image and the size of the reference output depth range.

11. The method according to claim 8, wherein the rendering further comprises generating a mixed pixel value based on the pixel value of the certain area and the pixel value of the adjacent area in the input image and providing the multi-view image in which the certain area of the input image is mapped to the mixed pixel value.

12. The method according to claim 11, wherein the generating comprises generating the mixed pixel value in a sub pixel unit of one of red (R), green (G), and blue (B) sub pixels.

13. The method according to claim 8, wherein the determining the output depth range based on the result of the adjusting further comprises, in response to the size of the depth range of the input image being smaller than the size of the reference output depth range, remapping the depth of the input image based on reliability information of the input image, the reliability information comprising a reliability value indicating an extent of reliability of the depth of the input image, and the rendering comprises rendering the plurality of image views based on the remapped depth.

* * * * *